United States Patent [19]
Yasui et al.

[11] 3,961,031
[45] June 1, 1976

[54] METHOD FOR REMOVAL OF MERCURY IN SULFUR DIOXIDE-CONTAINING GAS

[75] Inventors: Hiroshi Yasui, Tanashi; Iwao Kyono, Urawa; Hideo Aoki, Ageo; Haruo Manabe, Isuruga, all of Japan

[73] Assignee: Nippon Mining Co., Ltd., Tokyo, Japan

[22] Filed: Nov. 11, 1974

[21] Appl. No.: 522,832

[30] Foreign Application Priority Data
Nov. 9, 1973  Japan............................. 48-125514
Apr. 17, 1974 Japan............................. 49-42200

[52] U.S. Cl.................................. 423/210; 55/72; 423/561
[51] Int. Cl.² ....................................... B01D 53/34
[58] Field of Search.................... 423/210; 55/72

[56] References Cited
UNITED STATES PATENTS

| | | | |
|---|---|---|---|
| 3,725,530 | 4/1973 | Kawase et al. | 423/210 |
| 3,786,619 | 1/1974 | Melkersson et al. | 423/210 |
| 3,817,713 | 6/1974 | Ionescu | 423/210 |
| 3,838,190 | 9/1974 | Beike et al. | 423/210 |
| 3,849,537 | 11/1974 | Allgulin | 423/210 |
| 3,855,387 | 12/1974 | Brockmiller et al. | 423/210 |

*Primary Examiner*—Herbert T. Carter
*Attorney, Agent, or Firm*—Sughrue, Rothwell, Mion, Zinn & Macpeak

[57] ABSTRACT

A method for the removal of mercury contained in a sulfur dioxide-containing gas which comprises contacting the sulfur dioxide-containing gas with an aqueous thiourea solution which optionally contains an acid at an acid concentration higher than one normal to selectively absorb mercury in a vapor state.

7 Claims, 1 Drawing Figure

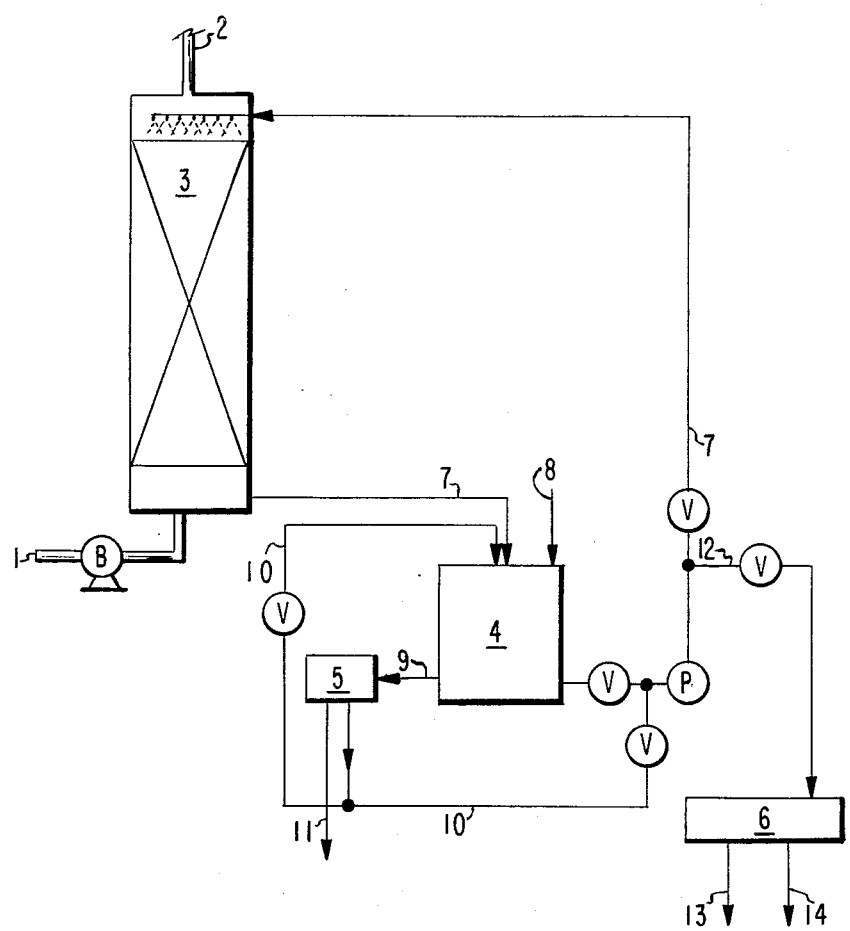

3,961,031

METHOD FOR REMOVAL OF MERCURY IN SULFUR DIOXIDE-CONTAINING GAS

BACKGROUND OF THE INVENTION

1. Field of the Invention

This invention relates to a method for the removal of mercury contained in a gas. More particularly, this invention relates to a method for efficiently removing a mercury vapor which is present in a small amount in a sulfur dioxide-containing gas.

2. Description of the Prior Art

Hitherto, a wide variety of methods have been proposed for the removal of a small amount of mercury vapor present in a gas using a washing solution. Typical conventional procedures include a method using an acidic oxidative solution such as an aqueous solution, for example, an aqueous sulfuric acid solution of manganese peroxide as a washing solution, a method using an aqueous solution containing divalent mercury ion and an anion such as chlorine, bromine or sulfuric acid ion as a washing solution, and a method using an aqueous sulfuric acid solution having a high temperature and a high sulfuric acid concentration as a washing solution.

However, there are various problems in these conventional procedures when they are applied to a sulfur dioxide-containing gas for the removal of a small amount of mercury vapor present in the gas. That is, the use of an oxidative acidic solution of sulfuric acid and manganese peroxide as a washing solution easily results in the reduction of oxidizing agents, i.e., manganese peroxide by sulfur dioxide present in the gas to be washed thereby remarkably decreasing the effect on the removal of the mercury vapor from the gas. The use of an aqueous solution containing divalent mercury ion and an anion such as chlorine, bromine, iodine or sulfuric acid ion, etc. as a washing solution also results in the reduction of a part of the divalent mercury ion present in the solution to a monovalent mercury ion by a sulfur dioxide in the gas, as is described above for the method comprising washing the gas with an oxidative solution, thereby remarkably decreasing the effect on the removal of the mercury vapor from the gas. The use of a sulfuric acid solution having a high temperature and a high sulfuric acid concentration as a washing solution generally does not adversely affect the effect on the removal of a mercury vapor by a sulfur dioxide present in the gas, but tends to cause corrosion, damage, etc. of the apparatus due to the high temperature and high concentration of sulfuric acid thereby making the method uneconomical in practical use.

SUMMARY OF THE INVENTION

As a result of various studies on the conventional methods described above for eliminating the disadvantages associated with these conventional methods, it was found that a small amount of mercury vapor present in the sulfur dioxide-containing gas can be effectively removed by washing the gas with an aqueous thiourea solution.

An object of this invention is therefore to provide a method for the removal of a mercury vapor present in a sulfur dioxide-containing gas which comprises contacting the gas with an aqueous thiourea solution which optionally contains an acid at an acid concentration higher than one normal.

BRIEF DESCRIPTION OF THE ACCOMPANYING DRAWING

FIGURE is a flow sheet of a typical embodiment of the method of this invention.

DETAILED DESCRIPTION OF THE INVENTION

Generally, a sulfur dioxide-containing gas generated by roasting or sintering sulfide minerals such as pyrite, zincblende, galena, etc. can be used for the production of sulfuric acid or a liquid sulfur dioxide, but the sulfur dioxide-containing gas usually contains a small amount of mercury vapor and other impurities originated from the minerals as a raw material, and these impurities are also introduced into the final products such as sulfuric acid and the like. Thus, it is necessary that the sulfur dioxide-containing gas used as a raw material for producing sulfuric acid be free from impurities, particularly from mercury.

However, gas refining systems presently used cannot effectively remove a small amount of mercury vapor and these impurities are necessarily introduced into the sulfuric acid production process.

The method of this invention comprises washing a sulfur dioxide-containing gas generated by roasting or sintering the sulfur minerals with an aqueous thiourea solution to selectively absorb a mercury vapor present in the gas into the aqueous thiourea solution to obtain a sulfur dioxide-containing gas which contains only a minimum amount of a mercury vapor or which is substantially free from a mercury vapor.

The concentration of sulfur dioxide in the gas used in the present invention is not critical, but the concentration is preferably higher than about 0.1% by volume, more preferably higher than about 0.5% by volume, and generally better results can be obtained with a high concentration of sulfur dioxide. When the sulfur dioxide concentration in the gas is less than about 0.1 percent, better results can be obtained by incorporating a material which is capable of generating $HSO_3^-$ ion such as sodium sulfite, acid sodium sulfite and the like into the aqueous thiourea solution as a washing solution.

Thiourea in the washing solution is preferably used at a high concentration for effectively removing a mercury vapor. However, when the concentration of thiourea is excessively high, sulfur tends to precipitate from the solution. A preferred concentration of thiourea in the washing solution is less than about 100 g per liter of the solution. The lower limit of the thiourea concentration is not critical but preferably higher than about 0.5 percent, more preferably higher than about 1.0% by weight.

In the method of this invention, better results can be obtained in an aqueous thiourea solution having an acidic pH value rather than a neutral pH value during the washing of a sulfur dioxide-containing gas. Further, when the pH value of the aqueous thiourea solution is maintained higher than about 0.5, addition of an alkali such as aqueous ammonia, sodium hydroxide, sodium carbonate, potassium carbonate, slaked lime, quick lime and the like is required for maintaining the pH value higher than about 0.5. Such addition of an alkali generally causes serious problems. For example, the amount of the alkali required increases with the lapse of time diring the washing procedure and, in addition, sulfur tends to precipitate vigorously from the solution upon discontinuing the addition of the alkali. On the other hand, when the pH value of an aqueous thiourea solution is less than about 0.5, only a small amount of sulfur precipitates from the solution and self-oxidation and reduction of acidic sulfite ion, etc. as well as the vigorous precipitation of sulfur can be remarkably prevented. Thus, the pH value of the aqueous thiourea solution is preferably maintained below about 0.5, more preferably at an acidity higher than 1 normal.

The method of this invention can be carried out using the aqueous thiourea solution which optionally contains the acid described above at a temperature of the solution below about 80°C, preferably below 50°C, by contacting a sulfur dioxide-containing gas with the aqueous thiourea solution in either a counter current or parallel stream in a packed column, wet-wall column, spray column or the like which is well known in the art to be suitable as a gas-liquid contacting apparatus.

A typical embodiment of the method in accordance with the present invention is described hereinafter in greater detail with respect to a gas generated by roasting sulfide minerals with reference to a flow sheet shown in FIGURE.

The sulfur dioxide-containing gas generated by toasting the sulfide minerals, for example, zinc concentrate or lead concentrate has a high temperature and a high dust content. This sulfide dioxide-containing gas (hereinafter referred to as "roasted gas") is first subjected to a cooling treatment in a waste-heat boiler, a gas cooler, etc. which is commonly used in the art, and then further subjected to a cooling treatment in a cyclone, a hot Cottrell, a washing column, a mist Cottrell, etc. and at the same time reducing the dust content in the roasted gas as low as possible. The gas 1 thus obtained is introduced into a gas washing column 3 where the roasted gas is washed with an aqueous thiourea solution 7 (hereinafter referred to as "washing solution") to partially remove a small amount of mercury vapor present in the roasted gas. The resulting roasted gas 2 having a very small content of mercury vapor is discharged from the column as a raw material for producing sulfuric acid. The gas washing column 3 used above can be a packed column or a spray column. The washing solution 7 which has absorbed mercury can be recycled by a recycling pump, and an additional amount of thiourea 8 can be supplied to a pump tank 4, if necessary. Since a small amount of sulfur precipitates from the washing solution, a part of the washing solution 9 is introduced into a filter 5 to remove the precipitated sulfur as a filter residue 11 out of the system. On the other hand, the filtrate 10 is returned to the pump tank 4 or recycled directly to the packed column 3 (or the spray tower 3). The filter 5 can be a conventional pressure filter packed with diatomaceous earth as a filter aid which is commonly used and well known in the art. If desired, the mercury thus absorbed can be recovered by withdrawing a part of the washing solution 12 for treatments with hydrogen sulfide, a hydrosulfide, etc. or a neutralization treatment to precipitate mercury as mercury sulfide and then subjecting the resulting mixture to a solid liquid separation by a filter 6 to separate a filtrate 13 and a filter residue 14.

As described above, the method of this invention is useful for effectively removing mercury from a gas which contains a reductive sulfur dioxide gas by absorbing the mercury in an aqueous thiourea solution, and the mercury thus absorbed can be recovered by subjecting the aqueous thiourea solution to a hydrogen sulfide or hydrosulfide treatment or a neutralization treatment to precipitate mercury sulfide. Since the mercury can be recovered in this procedure mainly as mercury sulfide, the recovered mercury has a high quality and contains a minimum amount of other metals as impurities. Thus, the resulting mercury sulfide can be used as a raw material for refining mercury.

The present invention is further illustrated in greater detail by the following Examples, but these Example are not to be construed as limiting the scope of this invention. Unless otherwise indicated, all parts, percents, ratios and the like are by weight.

EXAMPLE 1

50 g of thiourea (first grade) was dissolved in 1 liter of a 5% aqueous solution of sulfuric acid, and the resulting solution was recycled at a rate of 0.6 l per minute through an absorbing column having an inside diameter of 5 cm packed with Rasching ring at a height of 80 cm. A gas containing 5% by volume of sulfur dioxide was fed at the bottom of the column at a rate of 7 l per minute to absorb a mercury vapor contained in the gas. The mercury content in the feeding gas and the gas discharged from the outlet of the column was determined, and the results obtained are shown in Table 1 below.

Table 1

| Mercury Concentration in Feeding Gas ($mg/m^3$) | Mercury Concentration in Discharging Gas ($mg/m^3$) |
|---|---|
| 12 | 0.04 |
| 5 | 0.03 |
| 0.9 | 0.02 |

EXAMPLE 2

10 g of thiourea (first grade) was dissolved in 200 ml of a 5% aqueous solution of sulfuric acid charged in an absorbing bottle, and a gas containing 0.9 to 1.0 mg per $m^3$ of mercury vapor and sulfur dioxide gas at various concentrations was blown in the resulting solution at a gas rate of 2 liters per minute. The mercury concentration in the gas at the outlet of the bottle was determined, and the results obtained are shown in Table 2 below.

Table 2

| Sulfur Dioxide Concentration in Feeding Gas (%) | Mercury Concentration in Gas at Outlet of Bottle ($mg/m^3$) |
|---|---|
| 0 | 0.75 |
| 0.1 | 0.09 |
| 0.5 | 0.05 |
| 1.0 | 0.02 |
| 5.0 | 0.02 |
| 10.0 | 0.02 |
| 15.0 | 0.02 |

EXAMPLE 3

A gas containing 0.9 to 1.0 mg per $m^3$ of mercury vapor and 5% by volume of sulfur dioxide gas was blown at a rate of 2 liters per minute into 200 ml of a 5% aqueous sulfuric acid solution and thiourea at various concentrations charged in an absorbing bottle. The mercury concentration in the gas at the outlet of the bottle was determined, and the results obtained are shown in Table 3 below.

Table 3

| Thiourea Concentration in Solution (%) | Mercury Concentration in Gas at Outlet of Bottle (mg/m$^3$) |
| --- | --- |
| 0.5 | 0.10 |
| 1.0 | 0.08 |
| 3.0 | 0.02 |
| 5.0 | 0.02 |

EXAMPLE 4

10 g of thiourea (first grade) was dissolved in 200 ml of water or an aqueous sulfuric acid solution having various concentrations of sulfuric acid charged in an absorbing bottle, and a gas containing 0.9 to 1.0 mg per m$^3$ and 5% by volume of sulfur dioxide gas was blown into the solution at a rate of 2 liters per minute. The mercury concentration in the gas at the outlet of the bottle was determined, and the results obtained are shown in Table 4 below.

Table 4

| Sulfuric Acid Concentration in Solution (%) | Mercury Concentration in Gas at Outlet of Bottle (mg/m$^3$) |
| --- | --- |
| 0 | 0.06 |
| 0.5 | 0.04 |
| 1.0 | 0.03 |
| 2.0 | 0.03 |
| 5.0 | 0.02 |
| 10.0 | 0.02 |

EXAMPLE 5

10 g of thiourea (first grade) was dissolved in 200 ml of a 5% aqueous solution of sulfuric acid having various temperatures charged in an absorbing bottle, and a gas containing 0.9 to 1.0 mg per m$^3$ of mercury vapor and 5% by volume of sulfur dioxide was blown into the solution at a rate of 2 liters per minute. The mercury concentration in the gas at the outlet ot the bottle was determined, and the results obtained are shown in Table 5 below.

Table 5

| Temperature of Solution (°C) | Mercury Concentration in Gas at Outlet of Bottle (mg/m$^3$) |
| --- | --- |
| 30 | 0.02 |
| 35 | 0.02 |
| 50 | 0.04 |
| 80 | 0.09 |

EXAMPLE 6

A zinc sulfide refined ore was subjected to an oxidation roasting in a fluidized roasting furnace at a temperature of 1030°± 50°C while introducing air. The generated roasted gas was passed through a waste boiler, a cyclone, a hot Cottrell, a washing tower, a gas cooler and a first mist Cottrell to reduce the gas temperature and at the same time the dust content in the roasted gas. The resulting gas containing about 8 percent of sulfur dioxide and having a temperature of 35°± 5°C was introduced at a rate of 20 Nm$^3$ per minute at the bottom of a washing tower having an inside diameter of 1,000 mm packed with Terralet as a filler at a height of 3,000 mm, and a washing solution containing 100 g per liter of sulfuric acid and 40 g per liter of thiourea was sprayed downwardly at the top of the tower and recycled at a rate of 150 liters per minute. A part of the washing solution was continuously filtered using a pressure filter packed with diatomaceous earth as a filter aid. The mercury concentration of the gas at the inlet and outlet of the washing tower was determined using a Beckmann Mercury Vapor Analyzer, and the results obtained are shown in Table 6 below.

Table 6

| Treatment Time (hour) | Mercury Concentration in Gas | | Thiourea Concentration in Solution g/liter |
| --- | --- | --- | --- |
| | at Inlet (mg/m$^3$) | at Outlet (mg/m$^3$) | |
| 1 | 0.28 | 0.005 | 40.6 |
| 24 | 0.32 | 0.006 | 40.2 |
| 48 | 0.64 | 0.010 | 39.9 |
| 120 | 0.98 | 0.018 | 38.4 |
| 150 | 0.38 | 0.008 | 38.0 |

While the invention has been described in detail and with reference to specific embodiments thereof, it is apparent to one skilled in the art that various changes and modifications can be made therein without departing from the scope and spirit of the invention.

What is claimed is:

1. A method for the removal of mercury vapor contained in a sulfur dioxide-containing gas containing at least 0.1% by volume sulfur dioxide which comprises contacting the sulfur dioxide-containing gas with an aqueous thiourea solution having a pH below 0.5.

2. The method according to claim 1, wherein said aqueous thiourea solution has a thiourea concentration higher than 0.5% by weight.

3. The method according to claim 1, wherein said aqueous thiourea solution has a temperature below 80°C.

4. The method according to claim 1 wherein the aqueous thiourea solution also contains an acid at an acid concentration higher than one normal of said acid.

5. The method according to claim 4 wherein said aqueous thiourea solution has a thiourea concentration higher than 0.5% by weight.

6. The method according to claim 4 wherein said aqueous thiourea solution has a temperature below 80°C.

7. The mthod according to claim 4, wherein said acid is sulfuric acid.

\* \* \* \* \*